(12) United States Patent
Trim et al.

(10) Patent No.: US 10,410,639 B1
(45) Date of Patent: Sep. 10, 2019

(54) DETERMINING CONTEXTUAL RELEVANCE IN MULTI-AUDITORY SCENARIOS

(71) Applicant: INTERNATIONAL BUSINESS MACHINES CORPORATION, Armonk, NY (US)

(72) Inventors: Craig M. Trim, Ventura, CA (US); Victor Povar, Vancouver (CA); Sarbajit K. Rakshit, Kolkata (IN); Tory Mitchell Liesenfelt, Longmont, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/123,669

(22) Filed: Sep. 6, 2018

(51) Int. Cl.
| | |
|---|---|
| *G10L 15/00* | (2013.01) |
| *G10L 17/20* | (2013.01) |
| *G10L 17/04* | (2013.01) |
| *G06N 5/04* | (2006.01) |
| *G10L 21/0208* | (2013.01) |
| *G10L 15/22* | (2006.01) |
| *G06N 20/00* | (2019.01) |
| *G10L 17/00* | (2013.01) |

(52) U.S. Cl.
CPC ............. *G10L 17/20* (2013.01); *G06N 5/046* (2013.01); *G06N 20/00* (2019.01); *G10L 15/22* (2013.01); *G10L 17/04* (2013.01); *G10L 21/0208* (2013.01); *G10L 2015/223* (2013.01); *G10L 2021/02087* (2013.01)

(58) Field of Classification Search
CPC ..... G10L 17/20; G10L 15/22; G10L 21/0208; G10L 17/04; G10L 2021/02087; G10L 2015/223; G06N 20/00; G06N 5/046; G06F 15/18
USPC .......................................... 704/231, 246, 255
See application file for complete search history.

(56) References Cited

U.S. PATENT DOCUMENTS

| | | | |
|---|---|---|---|
| 7,797,079 B2 | 9/2010 | Jang et al. | |
| 9,789,605 B2 | 10/2017 | Meier et al. | |

(Continued)

FOREIGN PATENT DOCUMENTS

CN       107563517 A      1/2018

*Primary Examiner* — Thierry L Pham
(74) *Attorney, Agent, or Firm* — Jim Nock, Esq.; Wayne F. Reinke, Esq.; Heslin Rothenberg Farley & Mesiti P.C.

(57) ABSTRACT

A computer-implemented method for determining contextual relevance in multi-auditory source scenarios is disclosed, the method including receiving, by a cognitive system, auditory communications regarding a current activity, analyzing, by the cognitive system, each auditory communication to determine an intended action. For each intended action, the cognitive system creates a simulation to identify a resulting outcome of each intended action. The method further includes ranking, by the cognitive system, the resulting outcome, the ranking based on a comparison of each simulated result and the corresponding intended action regarding the current activity, and physically implementing the highest rated resulting outcome(s) for the current activity. The analyzing, in one example, includes assigning a weight to each of the relevant auditory communications based on one or more criterion, and ranking the relevant auditory communications by weight.

17 Claims, 8 Drawing Sheets

(56) References Cited

U.S. PATENT DOCUMENTS

2014/0249676 A1    9/2014  Florencio et al.
2017/0256256 A1*   9/2017  Wang .................. G10L 15/1822

* cited by examiner

US 10,410,639 B1

DETERMINING CONTEXTUAL RELEVANCE IN MULTI-AUDITORY SCENARIOS

BACKGROUND

One or more aspects of this disclosure relate, in general, to cognitive systems. More particularly, this disclosure relates to determining, by a cognitive system, a way to improve one or more aspects of a current activity based on input from multiple auditory sources.

Human performance of an activity with several people in close proximity providing comments and/or suggestions to the one performing the activity can be difficult, since there may be conflicting or diverse comments and/or suggestions, or one or more of the comments and/or suggestions may have no relevance, questionable or limited relevance to the current activity. Such situations are even more difficult for a cognitive system. For example, where several people are near a smart speaker interacting with a virtual assistant and more than one person is speaking, the virtual assistant may not be able to process the multiple requests or instructions.

SUMMARY

Shortcomings of the prior art are overcome and additional advantages are provided through the provision, in one aspect, of a computer-implemented method for determining contextual relevance in multi-auditory source scenarios. The method includes receiving, by a cognitive system, a plurality of auditory communications from multiple different auditory sources regarding a current activity, analyzing, by the cognitive system, each auditory communication of the plurality of auditory communications to determine an intended action of each auditory communication; creating a simulation of each intended action, by the cognitive system, to identify a resulting outcome of each intended action, each simulation taking into account one or more variables related to the same current activity; ranking, by the cognitive system, each resulting outcome, wherein the ranking is based on a comparison between the simulated result and the intended action regarding the same current activity; and physically implementing an action based on the ranking and the plurality of auditory communications.

In another aspect, a system for determining contextual relevance in multi-auditory source scenarios may be provided. The system may include, for example, memory(ies), at least one processor in communication with the memory(ies). Further, the system may include program instructions executable by the one or more processor via the memory to perform a method. The method may include, for example, receiving, by a cognitive system, a plurality of auditory communications from multiple different auditory sources regarding a current activity, analyzing, by the cognitive system, each auditory communication of the plurality of auditory communications to determine an intended action of each auditory communication; creating a simulation of each intended action, by the cognitive system, to identify a resulting outcome of each intended action, each simulation taking into account one or more variables related to the same current activity; ranking, by the cognitive system, each resulting outcome, wherein the ranking is based on a comparison between the simulated result and the intended action regarding the same current activity; and physically implementing an action based on the ranking and the plurality of auditory communications.

In a further aspect, a computer program product may be provided. The computer program product may include a non-transitory storage medium readable by a processor and storing instructions for performing a method. The method may include, for example, receiving, by a cognitive system, a plurality of auditory communications from multiple different auditory sources regarding a current activity, analyzing, by the cognitive system, each auditory communication of the plurality of auditory communications to determine an intended action of each auditory communication; creating a simulation of each intended action, by the cognitive system, to identify a resulting outcome of each intended action, each simulation taking into account one or more variables related to the same current activity; ranking, by the cognitive system, each resulting outcome, wherein the ranking is based on a comparison between the simulated result and the intended action regarding the same current activity; and physically implementing an action based on the ranking and the plurality of auditory communications.

Further, services relating to one or more aspects are also described and may be claimed herein.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects of the present invention, determining contextual relevance in multi-auditory communications is disclosed herein. Multiple auditory sources (e.g., two or more people and/or another cognitive system) provide auditory communications (e.g., comments, suggestions, commands, etc.) to a cognitive system (e.g., a robot or smart speaker for accessing a virtual assistant). The system analyzes each of the auditory communications to determine an intended action. The cognitive system then creates a simulation for each intended action to identify a resulting outcome of each intended action. The system then ranks the resulting outcomes based on a comparison between the simulated result and the intended action regarding the current activity. Once the cognitive system has the ranking, an action based on the auditory communications may be physically implemented. The physical implementation may be performed, for example, by the cognitive system (e.g., a robot) or, for example, by one or more entities other than the cognitive system (e.g., people or other robots), or a combination thereof.

As used herein, the term "cognitive system" refers to anything man made that is cognitive, for example, a virtual assistant or a robot, either autonomous or coupled to a computer or controller.

As used herein, the term "real-time" refers to a period of time necessary for data processing and presentation to a user to take place, and which is fast enough that a user does not perceive any significant delay. Thus, "real-time" is from the perspective of the user.

Figure 1:
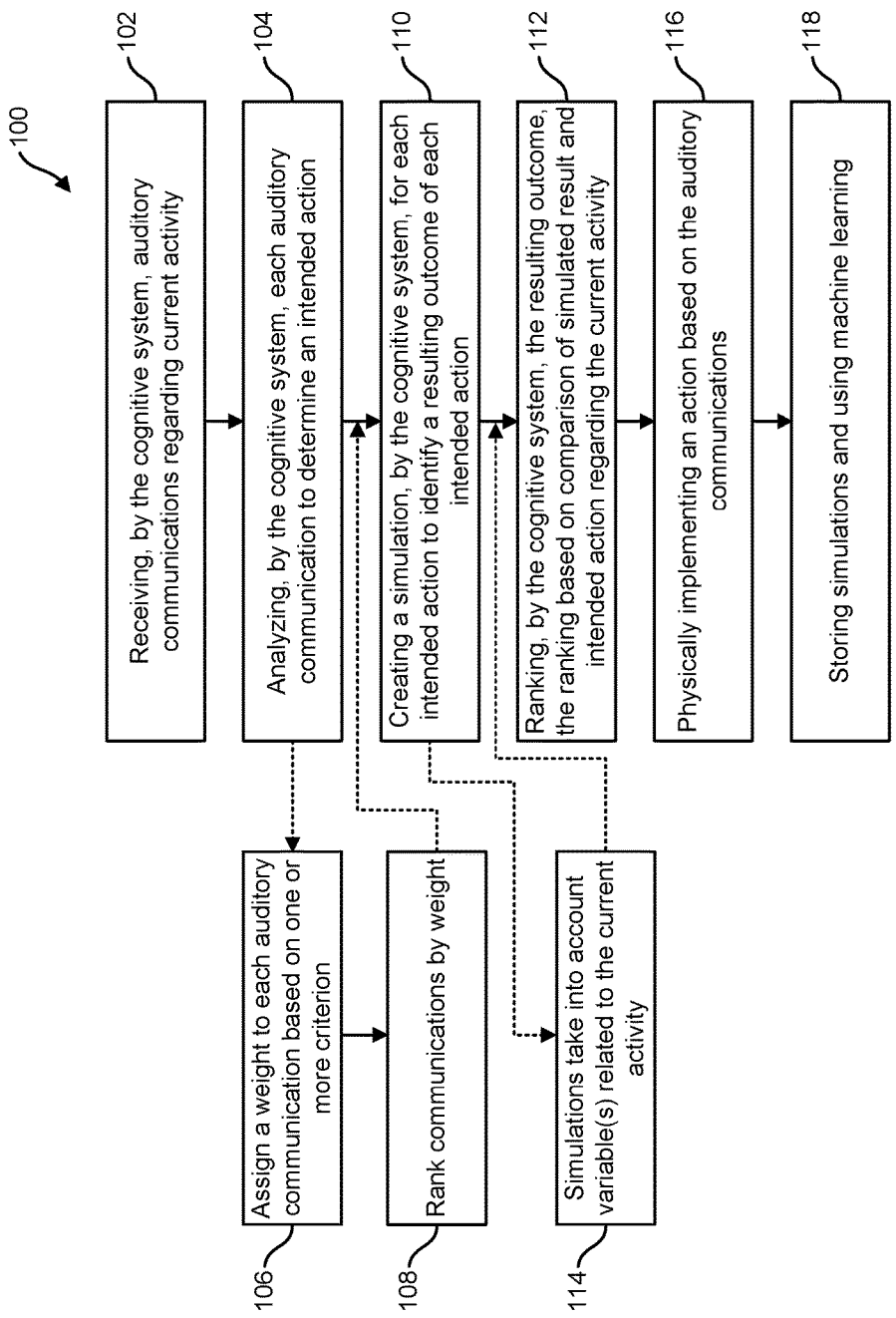
FIG. 1 is a flow diagram for one example of a computer-implemented method for determining contextual relevance in multi-auditory source scenarios, in accordance with one or more aspects of the present disclosure.

FIG. 1 is a flow diagram 100 for one example of a computer-implemented method for determining contextual relevance in multi-auditory source scenarios. The computer-implemented method includes receiving 102, by the cognitive system, auditory communications from multiple sources regarding a current activity. Isolating multiple auditory sources can be accomplished in any of a number of ways, for example, using multiple directional microphones, isolating pitch or wavelength in voice communications. In one example, the sources may include people. In another example, the sources may include one or more cognitive systems, including for example, cognitive computer systems and cognitive robots.

The method also includes analyzing 104, by the cognitive system, each auditory communication of the auditory communications received by the cognitive system to determine an intended action. The auditory communications are related to the current activity, for example, a suggestion how to improve the activity, how to be more efficient or addressing problems (e.g., physical and/or cognitive problems) arising during the activity. In one example, the activity may include anything physical and/or cognitive that ends with a physical implementation. In one example, analyzing may include assigning 106 a weight to each auditory communication, which may be based on, for example, one or more criterion (e.g., an authority of a source of the relevant communication or a relationship of the source to the activity). For example, an expert with expertise relevant to the activity would be considered to have more authority than a technician. The weighting could be accomplished in various ways, for example, as simply as using a scale from zero to 100, or, as another more complex example, using an algorithm and/or a formula.

In the case where weights are assigned to the auditory communications, the weighting results may, for example, be ranked 108 (e.g., ranked according to weight). A simulation is then created 110 by the cognitive system for each intended action to identify a resulting outcome of each intended action. The simulations can be created in any number of ways. In one example, they can be created using a modeling service, which creates models allowing the changing of variables. The cognitive system then ranks 112 the resulting outcome based on a comparison of each simulated result and the corresponding intended action regarding the current activity. In one example, the simulations may be intended for the cognitive system only. In another example, the simulations may be intended for the cognitive system and one or more observers. The simulations, in one example, may take into account 114, for example, one or more variables related to the current activity. In one example, the variable(s) include available resources, for example, tools, equipment, machines, computer resources, etc. In another example, the variable(s) include available people, for example, a technician, member(s) overseeing the activity, etc.

The cognitive system may determine that, for example, combining two or more intended actions from the ranking results in a best outcome. In such a case, the cognitive system will need to not only compare individual outcomes, but combinations of outcomes to a degree desired by the user. For example, the combinations may be limited to two outcomes. Once a highest ranked and one or more other intended actions is determined, the combination may be physically implemented 116 for the current activity. It may also be desirable to store 118 the simulations in a database and employ periodic machine learning to improve the choice of best outcome. Various machine learning techniques can be used, including for example, machine learning as a service, which uses the customer's data to create, train and deploy machine learning and deep learning models.

In one embodiment, for any information needed to be understood from text, for example, text of auditory communications, Natural Language Understanding (previously known as Natural Language Processing) and Natural Language Classification can be used. The auditory communications can be converted to text with any number of speech-to-text applications or services, which can transcribe multiple languages and identify and transcribe in real time what is being said, even from lower quality audio, across a variety of audio formats and programming interfaces.

The umbrella term "Natural Language Understanding" can be applied to a diverse set of computer applications, ranging from small, relatively simple tasks such as, for example, short commands issued to robots, to highly complex endeavors such as, for example, the full comprehension of newspaper articles or poetry passages. Many real world applications fall between the two extremes, for example, text classification for the automatic analysis of emails and their routing to a suitable department in a corporation does not require in-depth understanding of the text, but it does need to work with a much larger vocabulary and more diverse syntax than the management of simple queries to database tables with fixed schemata.

Regardless of the approach used, most natural language understanding systems share some common components. The system needs a lexicon of the language and a parser and grammar rules to break sentences into an internal representation. The construction of a rich lexicon with a suitable ontology requires significant effort, for example, the WORDNET lexicon required many person-years of effort. WORDNET is a large lexical database of English. Nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated, for example, with a browser specially configured to provide the navigation functionality. WORDNET's structure makes it a useful tool for computational linguistics and natural language processing.

WORDNET superficially resembles a thesaurus, in that it groups words together based on their meanings. However, there are some important distinctions. First, WORDNET interlinks not just word forms—strings of letters—but specific senses of words. As a result, words that are found in close proximity to one another in the network are semantically disambiguated. Second, WORDNET labels the semantic relations among words, whereas the groupings of words in a thesaurus does not follow any explicit pattern other than meaning similarity.

The system also needs a semantic theory to guide the comprehension. The interpretation capabilities of a language understanding system depend on the semantic theory it uses. Competing semantic theories of language have specific trade-offs in their suitability as the basis of computer-automated semantic interpretation. These range from naive semantics or stochastic semantic analysis to the use of pragmatics to derive meaning from context.

Advanced applications of natural language understanding also attempt to incorporate logical inference within their framework. This is generally achieved by mapping the derived meaning into a set of assertions in predicate logic, then using logical deduction to arrive at conclusions. Therefore, systems based on functional languages such as the Lisp programming language need to include a subsystem to represent logical assertions, while logic-oriented systems such as those using the language Prolog, also a programming language, generally rely on an extension of the built-in logical representation framework.

A Natural Language Classifier, which could be a service, for example, applies cognitive computing techniques to return best matching predefined classes for short text inputs, such as a sentence or phrase. It has the ability to classify phrases that are expressed in natural language into categories. Natural Language Classifiers ("NLCs") are based on Natural Language Understanding (NLU) technology (previously known as "Natural Language Processing"). NLU is a field of computer science, artificial intelligence (AI) and computational linguistics concerned with the interactions between computers and human (natural) languages.

For example, consider the following questions: "When can you meet me?" or When are you free?" or "Can you meet me at 2:00 PM?" or "Are you busy this afternoon?" NLC can determine that they are all ways of asking about "setting up an appointment." Short phrases can be found in online discussion forums, emails, social media feeds, SMS messages, and electronic forms. Using, for example, an Application Programming Interface (API) one can send text from these sources to a natural language classifier trained using machine learning techniques. The classifier will return its prediction of a class that best captures what is being expressed in that text. Based on the predicted class one can trigger an application to take the appropriate action such as providing an answer to a question, suggest a relevant product based on expressed interest or forward the text to an appropriate human expert who can help.

Applications of such APIs include, for example, classifying email as SPAM or No-SPAM based on the subject line and email body; creating question and answer (Q&A) applications for a particular industry or domain; classifying news content following some specific classification such as business, entertainment, politics, sports, and so on; categorizing volumes of written content; categorizing music albums following some criteria such as genre, singer, and so on; combining a Watson Natural Language Classifier service if one wants their application to engage in a conversation with a user; and classifying frequently asked questions (FAQs).

Figure 7:
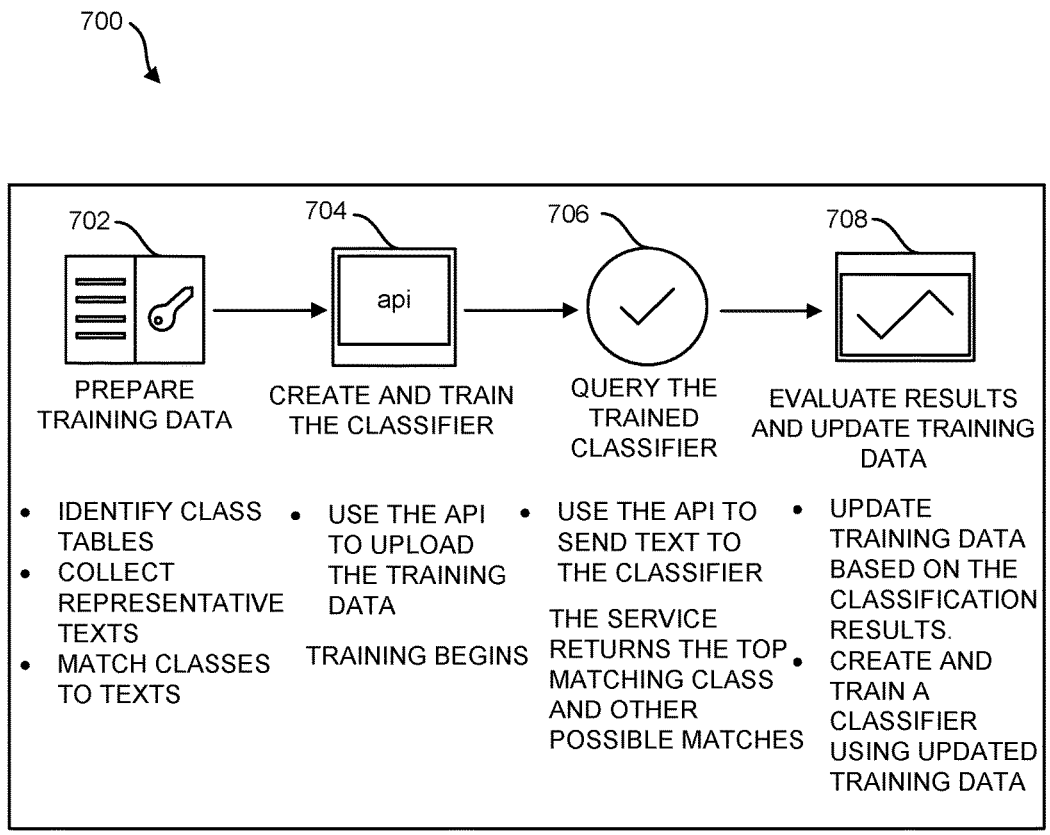
FIG. 7 depicts one example of creating and using a natural language classifier, in accordance with one or more aspects of the present disclosure.

FIG. 7 is a hybrid flow diagram 700 of one example of an overview of the basic steps for creating and using a natural language classifier service. Initially, training data for machine learning is prepared, 702, by identifying class tables, collecting representative texts and matching the classes to the representative texts. An API (Application Planning Interface) may then be used to create and train the classifier 704 by, for example, using the API to upload training data. Training may begin at this point. After training, queries can be made to the trained natural language classifier, 706. For example, the API may be used to send text to the classifier. The classifier service then returns the matching class, along with other possible matches. The results may then be evaluated and the training data updated, 708, for example, by updating the training data based on the classification results. Another classifier can then be trained using the updated training data.

A data processing system, as described herein, can run a Natural Language Understanding (NLU) process for determining one or more NLU output parameter of a message. An NLU process can include, for example, one or more of a topic classification process that determines topics of messages and output one or more topic NLU output parameter, a sentiment analysis process which determines sentiment parameter for a message, e.g. polar sentiment NLU output parameters, "negative," "positive," and/or non-polar NLU output sentiment parameters, e.g. "anger," "disgust," "fear," "joy," and/or "sadness" or other classification process for output of one or more other NLU output parameters e.g. one or more "social tendency" NLU output parameter or one or more "writing style" NLU output parameter.

By running an NLU process, the data processing system can perform a number of processes including one or more of (a) topic classification and output of one or more topic NLU output parameter for a received message (b) sentiment classification and output of one or more sentiment NLU output parameter for a received message or (c) other NLU classifications and output of one or more other NLU output parameter for the received message.

Topic analysis for topic classification and output of NLU output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLU parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader).

In one example, sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Figure 2:
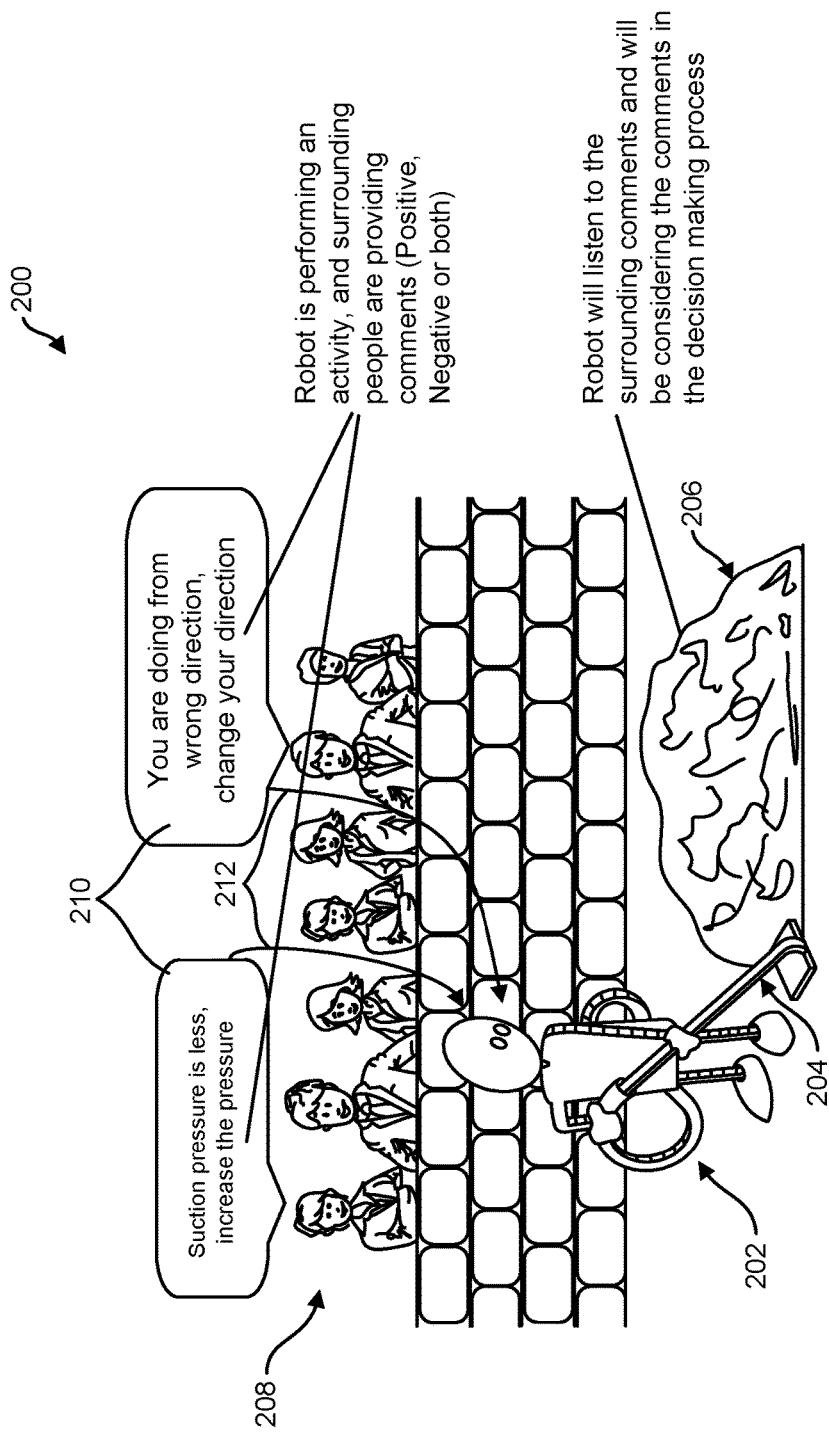
FIG. 2 depicts one example of a multi-auditory scene, in accordance with one or more aspects of the present disclosure.

FIG. 2 depicts one example of a multi-auditory scene 200, in accordance with one or more aspects of the present disclosure. In the scene, a robot 202 is vacuuming 204 debris 206. In proximity to the robot is a group of people 208 offering various comments/suggestions 210 regarding the vacuuming, such as, for example, increasing the suction pressure and changing the direction of the vacuum nozzle. While performing the activity, apart from an inbuilt execution plan, the robot will also be gathering 212 the surrounding comments and validating if the comments are contextually relevant to the activity. If the comments are not appropriate or otherwise not contextually relevant, such comments will not be considered. The robot will assess each comment and will be validating the same within the current context of the activity by performing a computer simulation. During the simulation process, the robot will either reject the comment or will accept the same in the decision making process. Based on the simulation results, the outcomes may be ranked using a comparison of each simulated result and the corresponding intended action regarding the current activity. The highest ranked outcome may be physically implemented by, for example, the robot and/or other entities (e.g., people, robots, etc.). The robot can use self-learning with regard to the accepted and rejected comments, which can become part of a knowledgebase, improving the decisions made by the robot. In a multi-robot ecosystem, the computer simulation of each comment will be done in a collaborative manner, in one example, or, in another example, a lead robot could be named for doing the simulations.

In FIG. 2, one person commented "suction pressure is less, increase the pressure," the intent of which the robot discerns to be a suggestion to increase the pressure, then the robot will create a simulation that increases the suction pressure to identify any contextual improvement in the current activity. Another person in the group 208 commented that "you are doing from wrong direction, change your direction," the intent of which the robot determines to be that the path of the suction nozzle should change. Thus, the simulation for this comment will examine one or more other directions for the nozzle to see if there is contextual improvement in the activity, e.g., debris the robot was unable to get due to placement can now be vacuumed up. During simulation of each comment the robot will consider in addition to other considerations, for example, machine or equipment capacity, the visual modeling of the activity and the current execution plan. The robot will be considering the comments which provided positive results (e.g., an improvement in efficiency or reduction in effort and/or resources needed), and accordingly will be implemented in the physical execution.

Figure 3:
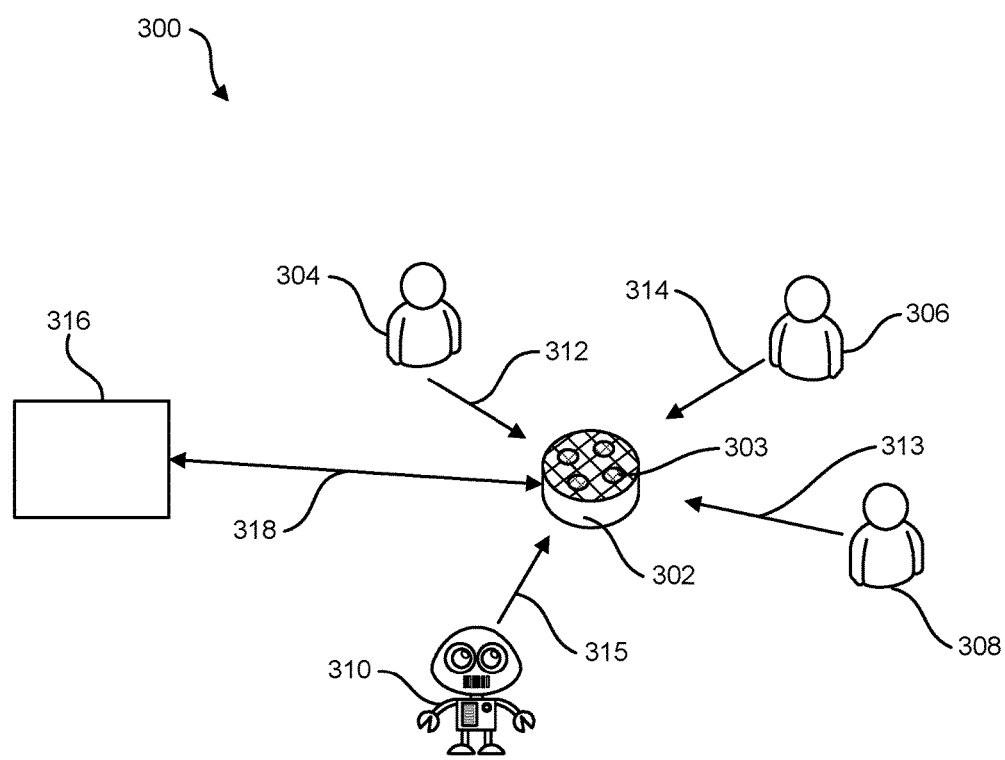
FIG. 3 depicts another example of a multi-auditory scene, in accordance with one or more aspects of the present disclosure.

FIG. 3 depicts another example of a multi-auditory scene 300, in accordance with one or more aspects of the present disclosure. In this example, the cognitive system comprises a smart speaker 302 for accessing a virtual assistant. In one example, the smart speaker is in some manner communicatively connected 318 to a server 316 (see FIG. 5 discussion), which receives the auditory communications 312 and 314 and provides a virtual assistant response to the smart speaker for listening to by the auditory sources. The smart speaker includes an array of microphones 303 for listening to questions, requests, orders, etc. from multiple auditory sources. In this example, the multiple auditory sources take the form of multiple people 304, 306 and 308 and cognitive system 310 (e.g., a cognitive robot) that are in close proximity to the smart speaker. "Close proximity" in this example is a practical range for the array of microphones to "hear" questions, requests, orders, etc. from multiple people. The current activity in this example is cooking dinner, including three family members and the family robot. These are the auditory sources. The virtual assistant is helping them decide what to make, based on the ingredients at hand; in this case, bread, roast beef, sliced cheese, chicken breasts, broccoli and boxed macaroni and cheese. In this example, person 304 instructs the virtual assistant to play 312 some jazz. At approximately the same time, person 306 comments 314 that they should make roast beef sandwiches, while person 308 comments that they should make chicken and vegetables. The robot 310 comments that one person 314's favorite dish is macaroni and cheese.

The auditory communications from the auditory sources (here, the family and a robot) are analyzed by the cognitive system, represented by the virtual assistant. As part of the analysis, the cognitive system determines whether each of the auditory communications is relevant to the current activity, in this case, members of a family deciding what to make for dinner. The request for jazz is considered by the virtual assistant not to mean a food related comment. As such, it is determined not to be relevant to the current activity, while the other requests are all determined to be relevant to the current activity. The cognitive system creates a simulation for each intended action to identify a resulting outcome of each intended action. From the simulations, the cognitive system ranks the resulting outcomes based on a comparison of each simulated result and the corresponding intended action regarding the current activity. In this case, the cognitive system determines that the highest ranking outcome is a combination; namely, chicken and vegetables, which is nutritionally the best suggested option, but because macaroni and cheese is one of person 314's favorite dishes, it is designated as a second side dish. In the example of FIG. 3, the physical implementation of the highest rated outcome involves the family preparing the dinner.

Figure 8:
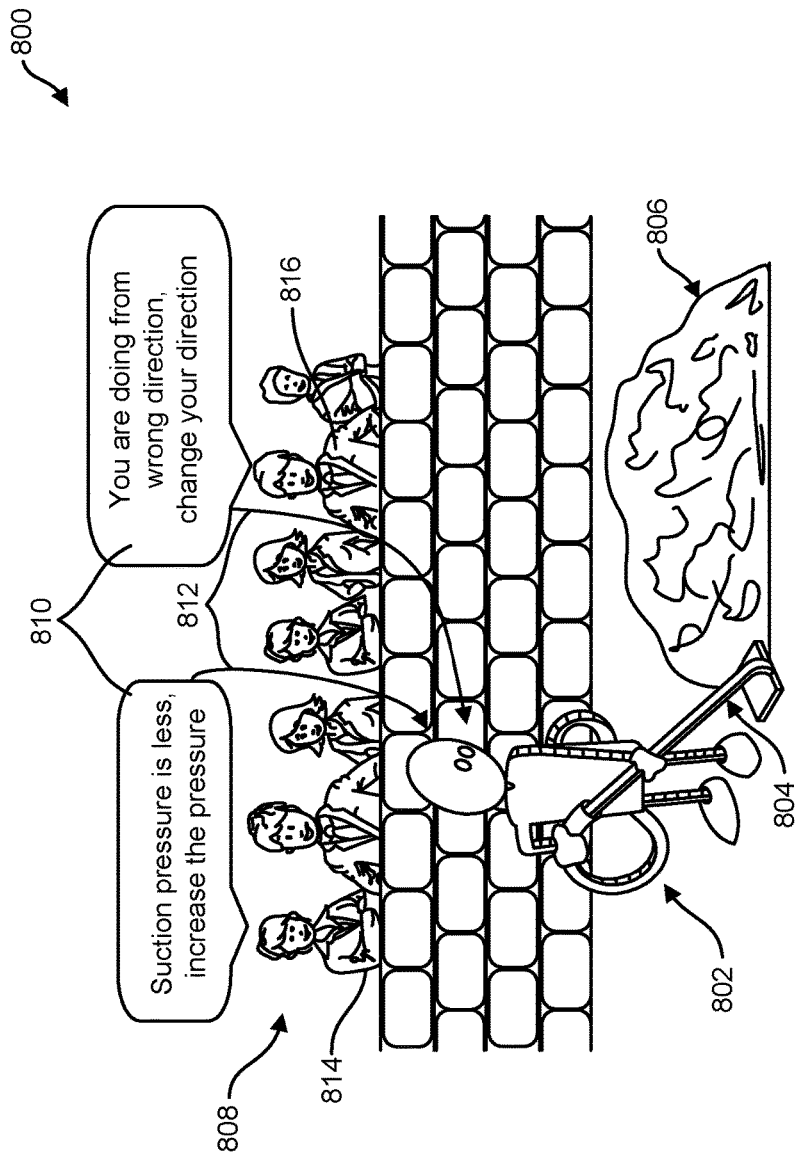
FIG. 8 depicts a third example of a multi-auditory scene, in accordance with one or more aspects of the present disclosure.

FIG. 8 depicts a third example of a multi-auditory scene 800, in accordance with one or more aspects of the present disclosure. In the scene, a robot 802 is vacuuming 804 debris 806. In proximity to the robot is a group of people 808 offering various comments/suggestions 810 regarding the vacuuming, such as, for example, increasing the suction pressure and changing the direction of the vacuum nozzle. Person 814 works for a company controlling the robot as a mid-level manager. Person 816 also works for the same company as an upper-level manager with a higher authority than person 814. While performing the activity, apart from an inbuilt execution plan, the robot will also be gathering 812 the surrounding comments and validating if the comments are contextually relevant to the activity. If the comments are not appropriate or otherwise not contextually relevant, such comments will not be considered. In addition, the robot is able to identify particular people whose voice signature is accessible to the robot, such as, for example, employees of the company controlling the robot. The robot will assess each comment and will be validating the same within the current context of the activity and performing a computer simulation. During the simulation process, the robot will either reject the comment or will accept the same in the decision making process. Based on the simulation results, the outcomes may be ranked using a comparison of each simulated result and the corresponding intended action regarding the current activity. The highest ranked outcome, which may be one or a combination of two or more outcomes may be physically implemented by, for example, the robot and/or other entities (e.g., people, robots, etc.). The robot can use self-learning with regard to the accepted and rejected comments, which can become part of a knowledgebase, improving the decisions made by the robot. In a multi-robot ecosystem, the computer simulation of each comment will be done in a collaborative manner, in one example, or, in another example, a lead robot could be named for doing the simulations.

In FIG. 8, person 814 commented to increase the pressure and person 816 commented the robot should change direction. During simulation of each comment, the robot will consider, for example, an authority of the source of the comment, machine or equipment capacity, the visual modeling of the activity and the current execution plan. The robot will be considering the comments which provided positive results (e.g., an improvement in efficiency or reduction in effort and/or resources needed), and accordingly will be implemented in the physical execution. In this example, since speaker 816 has a higher authority than person 814, the robot will give more weight to person 816's suggestion versus that of person 814.

In a first aspect, disclosed above is a computer-implemented method for determining contextual relevance in multi-auditory source scenarios. The method includes receiving, by a cognitive system, auditory communications regarding a current activity, analyzing, by the cognitive system, each auditory communication to determine an intended action of each auditory communication, creating a simulation of each intended action, by the cognitive system, to identify a resulting outcome of each intended action, ranking, by the cognitive system, the resulting outcome, wherein the ranking is based on a comparison between the simulated result and the intended action regarding the current activity, and physically implementing an action based on the plurality of auditory communications.

In one example, the method may further include, for example, storing each simulation and the current context in a database, and using machine learning based on data in the database to improve the ranking.

In one example, the analyzing in the method of the first aspect may include, for example, assigning a weight to each auditory communications based on one or more criterion, and ranking each auditory communications by weight. In one example, the one or more criterion may include, for example, an authority of a source of each auditory communication.

In one example, the one or more criterion may include, for example, a relationship of a source of each auditory communication with the current activity.

In one example, the receiving in the method of the first aspect may include, for example, receiving the audio communications via directional microphones.

In one example, the cognitive system in the method of the first aspect may include, for example, a robot.

In one example, the cognitive system in the method of the first aspect may include, for example, a virtual assistant, and the physically implementing may be, for example, performed by other than the virtual assistant.

In one example, each simulation in the method of the first aspect may, for example, take into account variable(s) related to the current activity. In one example, the variable(s) may include, for example, at least one of available resources and available people.

In a second aspect, disclosed above is a system. The system includes a memory, and processor(s) in communication with the memory to perform a method. The method includes receiving, by a cognitive system, auditory communications regarding a current activity, analyzing, by the cognitive system, each auditory communication to determine an intended action of each auditory communication, creating a simulation of each intended action, by the cognitive system, to identify a resulting outcome of each intended action, ranking, by the cognitive system, the resulting outcome, wherein the ranking is based on a comparison between the simulated result and the intended action regarding the current activity, and physically implementing an action based on the plurality of auditory communications.

In one example, the analyzing may include, for example, assigning a weight to each of the relevant auditory communications based on one or more criterion, and ranking the relevant auditory communications by weight. In one example, the one or more criterion may include, for example, one of an authority of a source of the relevant auditory communication and a relationship of a source of the relevant auditory communication with the current activity.

In one example, each simulation in the system of the second aspect may, for example, take into account variable(s) related to the current activity. In one example, the variable(s) may include, for example, at least one of available resources and available people.

In a third aspect, disclosed above is a computer program product for determining contextual relevance in multi-auditory source scenarios. The computer program product includes a storage medium readable by a processor and storing instructions for determining contextual relevance in multi-auditory source scenarios, the method including receiving, by a cognitive system, auditory communications regarding a current activity, analyzing, by the cognitive system, each auditory communication to determine an intended action of each auditory communication, creating a simulation of each intended action, by the cognitive system, to identify a resulting outcome of each intended action, ranking, by the cognitive system, the resulting outcome, wherein the ranking is based on a comparison between the simulated result and the intended action regarding the current activity, and physically implementing an action based on the plurality of auditory communications.

In one example, the analyzing may include, for example, assigning a weight to each of the relevant auditory communications based on one or more criterion, and ranking the relevant auditory communications by weight. In one example, the one or more criterion may include, for example, one of an authority of a source of the relevant auditory communication and a relationship of a source of the relevant auditory communication with the current activity.

In one example, each simulation in the computer program product of the third aspect may, for example, take into account variable(s) related to the current activity. In one example, the variable(s) may include, for example, at least one of available resources and available people.

Certain embodiments herein may offer various technical computing advantages involving computing advantages to address problems arising in the realm of activities of a cognitive system while receiving multiple, possibly conflicting, auditory inputs (e.g., comments of people or other cognitive systems). Embodiments herein receive, by a cognitive system, auditory communications regarding a current activity and analyzing each auditory communication to determine an intended action and, in one example, may include a relevance of the intended action. For each intended action, the cognitive system may create a simulation to identify a resulting outcome of each intended action, ranking the resulting outcome based on a comparison of each simulated result and the corresponding intended action regarding the current activity and physically implementing the highest ranked outcome(s) for the activity. Embodiments herein utilize machine learning to improve the cognitive determination of the best outcome. Embodiments herein analyze auditory communications by assigning weights based on criteria/criterion and ranking the communications, for example, by weight. Embodiments herein recognize that the auditory communications have different levels of relevance or come from sources with varying authority or relationships to the current activity.

Various decision data structures can be used to drive artificial intelligence (AI) decision making, such as decision data structure that cognitively maps social media interactions in relation to posted content in respect to parameters for use in better allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

Figure 4:
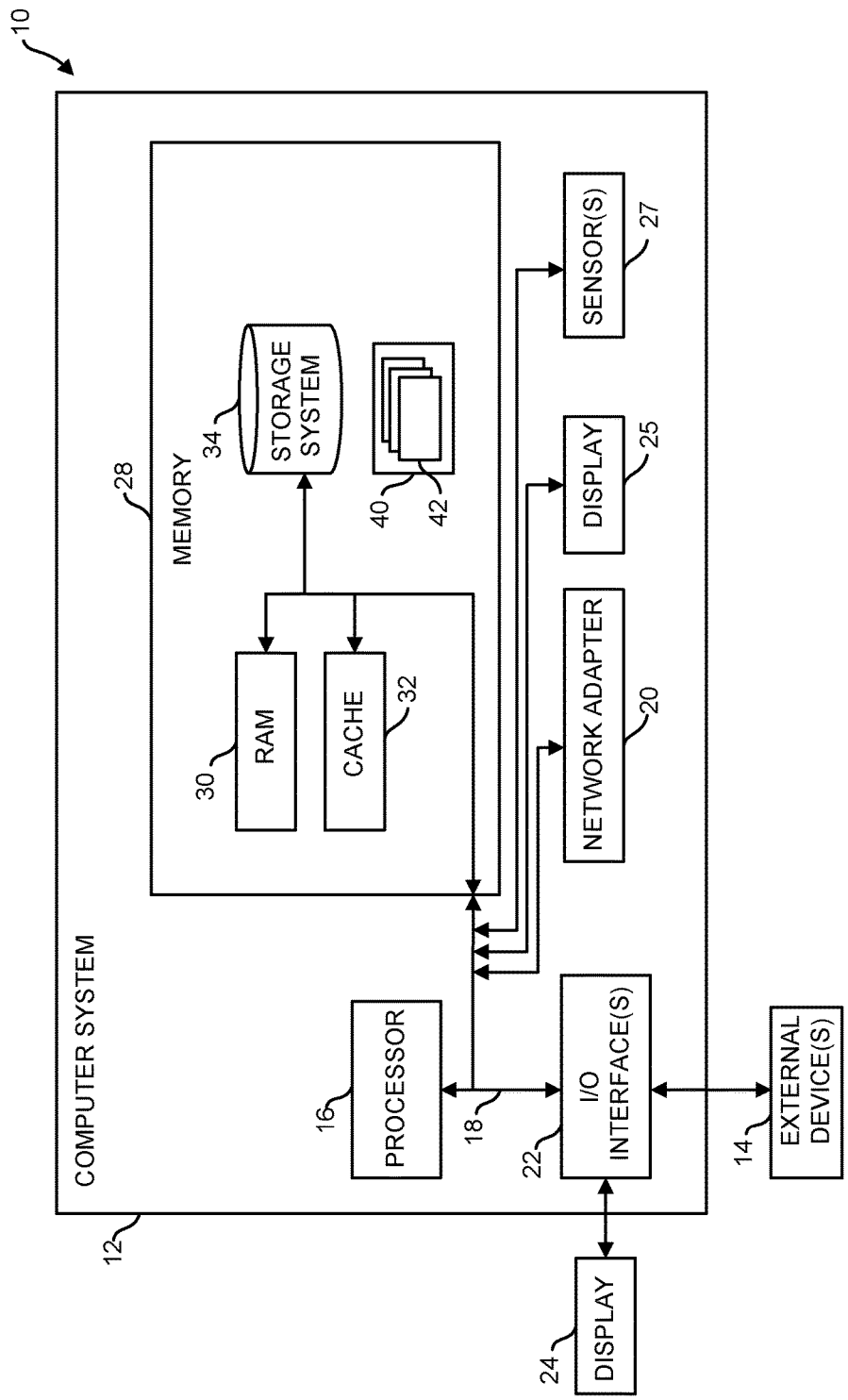
FIG. 4 is a block diagram of one example of a computer system, in accordance with one or more aspects of the present disclosure.
Figure 5:
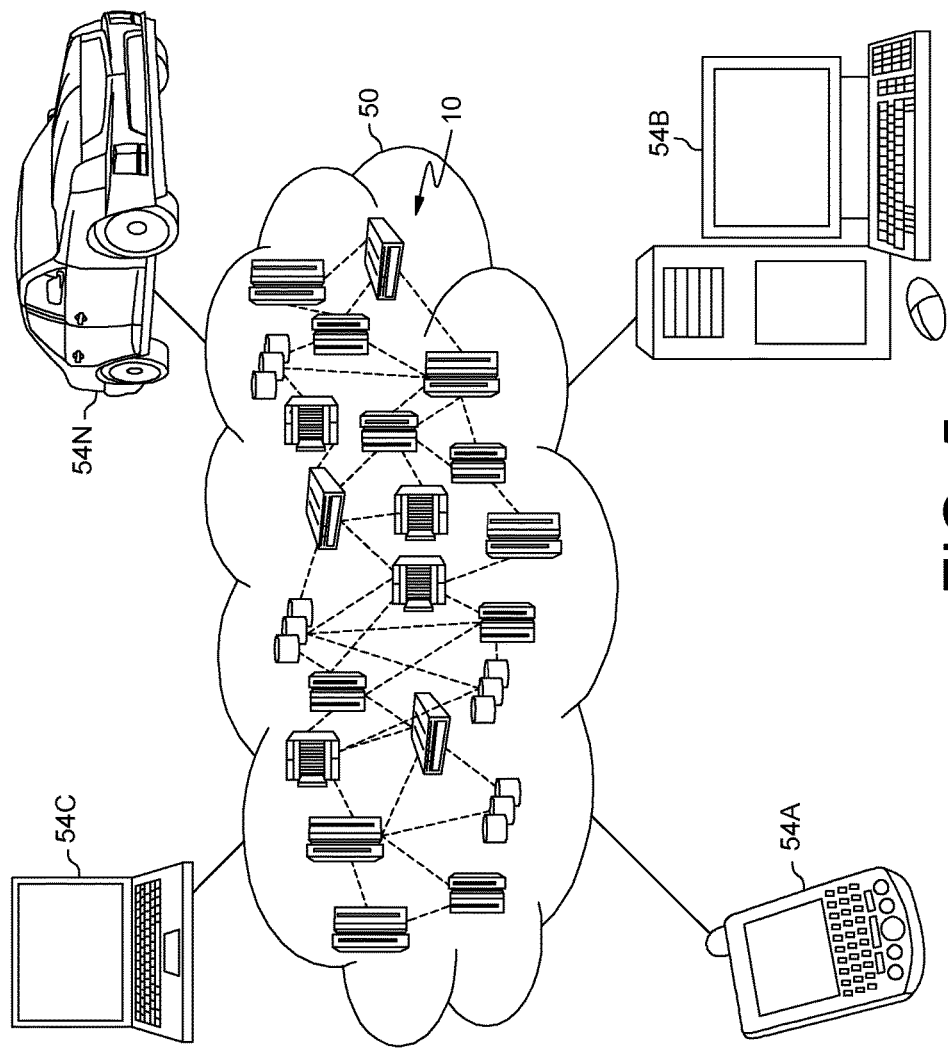
FIG. 5 is a block diagram of one example of a cloud computing environment, in accordance with one or more aspects of the present disclosure.
Figure 6:
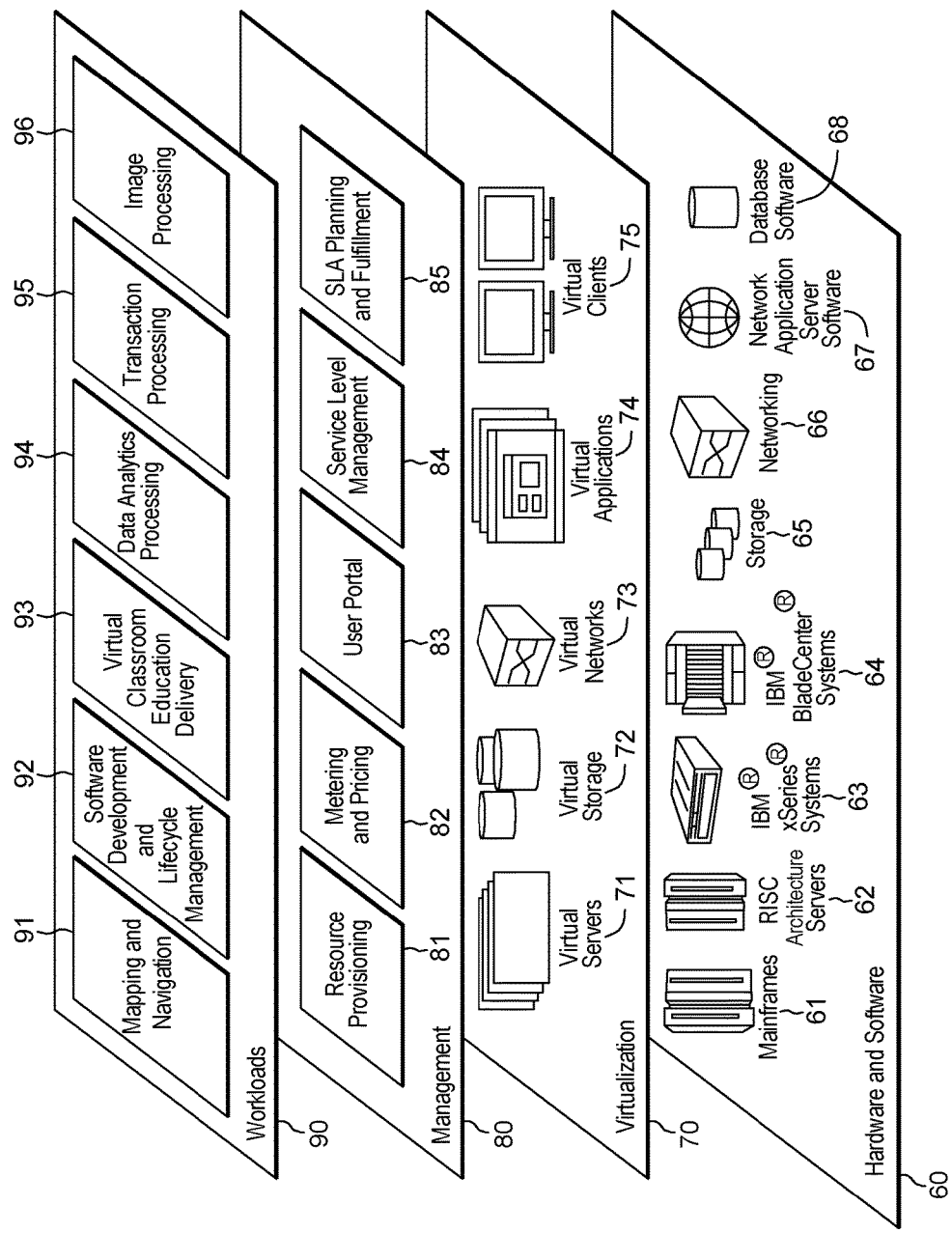
FIG. 6 is a block diagram of one example of functional abstraction layers of the cloud computing environment of FIG. 5, in accordance with one or more aspects of the present disclosure.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 5-6.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, manager system 110 can include one or more computing node 10 and can include one or more program 40 for performing functions described with reference to method 200 of FIG. 2 and functions described with reference to method 300 of FIG. 3 and functions described with reference to manager system 110 as set forth in the flowchart of FIG. 4. In one embodiment, one or more client computer device 130A-130Z can include one or more computing node 10 and can include one or more program 40 for performing functions described with reference to one or more client computer device 130A-130Z as set forth in the flowchart of FIG. 4. In one embodiment, administrator client computer device 125 can include one or more computing node 10 and can include one or more program 40 for performing functions described with reference to administrator client computer device 125 as set forth in the flowchart of FIG. 4. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 5 computing node 10 is described as being implemented in a cloud computing environment and accordingly is referred to as a cloud computing node in the context of FIG. 5.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

In general, the term "cognitive computing" (CC) has been used to refer to new hardware and/or software that mimics the functioning of the human brain and helps to improve human decision-making, which can be further improved using machine learning. In this sense, CC is a new type of computing with the goal of more accurate models of how the human brain/mind senses, reasons, and responds to stimulus. CC applications link data analysis and adaptive page displays (AUI) to adjust content for a particular type of audience. As such, CC hardware and applications strive to be more effective and more influential by design.

Some common features that cognitive systems may express include, for example: ADAPTIVE—they may learn as information changes, and as goals and requirements evolve. They may resolve ambiguity and tolerate unpredictability. They may be engineered to feed on dynamic data in real time, or near real time; INTERACTIVE—they may interact easily with users so that those users can define their needs comfortably. They may also interact with other processors, devices, and Cloud services, as well as with people;

ITERATIVE AND STATEFUL—they may aid in defining a problem by asking questions or finding additional source input if a problem statement is ambiguous or incomplete. They may "remember" previous interactions in a process and return information that is suitable for the specific application at that point in time; and CONTEXTUAL—they may understand, identify, and extract contextual elements such as meaning, syntax, time, location, appropriate domain, regulations, user's profile, process, task and goal. They may draw on multiple sources of information, including both structured and unstructured digital information, as well as sensory inputs (e.g., visual, gestural, auditory and/or sensor-provided).

FIG. 6 is a hybrid flow diagram 600 of one example of an overview of the basic steps for creating and using a natural language classifier service. Initially, training data for machine learning is prepared, 602, by identifying class tables, collecting representative texts and matching the classes to the representative texts. An API (Application Planning Interface) may then be used to create and train the classifier 604 by, for example, using the API to upload training data. Training may begin at this point. After training, queries can be made to the trained natural language classifier, 606. For example, the API may be used to send text to the classifier. The classifier service then returns the matching class, along with other possible matches. The results may then be evaluated and the training data updated, 608, for example, by updating the training data based on the classification results. Another classifier can then be trained using the updated training data.

FIG. 7 is a hybrid flow diagram 700 of one example of an overview of the basic steps for creating and using a natural language classifier service. Initially, training data for machine learning is prepared, 702, by identifying class tables, collecting representative texts and matching the classes to the representative texts. An API (Application Planning Interface) may then be used to create and train the classifier 704 by, for example, using the API to upload training data. Training may begin at this point. After training, queries can be made to the trained natural language classifier, 706. For example, the API may be used to send text to the classifier. The classifier service then returns the matching class, along with other possible matches. The results may then be evaluated and the training data updated, 708, for example, by updating the training data based on the classification results. Another classifier can then be trained using the updated training data.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method for determining contextual relevance in multi-auditory source scenarios, the method comprising:
    receiving, by a cognitive system, a plurality of auditory communications from multiple different auditory sources regarding a same current activity;
    analyzing, by the cognitive system, each auditory communication of the plurality of auditory communications to determine an intended action of each auditory communication;
    creating a simulation of each intended action, by the cognitive system, to identify a resulting outcome of each intended action, wherein each simulation takes into account one or more variables related to the same current activity;
    ranking, by the cognitive system, each resulting outcome, wherein the ranking is based on a comparison between the simulated result and the intended action regarding the same current activity; and
    physically implementing an action based on the ranking and the plurality of auditory communications.

2. The computer-implemented method of claim 1, further comprising:
    storing each simulation and current context in a database; and
    using machine learning based on data in the database to improve the ranking.

3. The computer-implemented method of claim 1, wherein the analyzing comprises:
    assigning a weight to each auditory communication based on one or more criterion; and
    ranking each auditory communication by weight.

4. The computer-implemented method of claim 3, wherein the one or more criterion comprises an authority of a source of each auditory communication.

5. The computer-implemented method of claim 3, wherein the one or more criterion comprises a relationship of a source of each auditory communication with the same current activity.

6. The computer-implemented method of claim 1, wherein the receiving comprises receiving the plurality of auditory communications via a plurality of directional microphones.

7. The computer-implemented method of claim 1, wherein the cognitive system comprises a robot.

8. The computer-implemented method of claim 1, wherein the cognitive system comprises a virtual assistant, and wherein the physically implementing is performed by other than the virtual assistant.

9. The computer-implemented method of claim 1, wherein the one or more variables comprises at least one of available resources and available people.

10. A system for determining contextual relevance in multi-auditory source scenarios, the computer program product comprising:
    a memory; and
    at least one processor in communication with the memory to perform a method, the method comprising:
        receiving, by a cognitive system, a plurality of auditory communications from multiple different auditory sources regarding a same current activity;
        analyzing, by the cognitive system, each auditory communication of the plurality of auditory communications to determine an intended action of each auditory communication;
        creating a simulation of each intended action, by the cognitive system, to identify a resulting outcome of each intended action, wherein each simulation takes into account one or more variables related to the same current activity;
        ranking, by the cognitive system, each resulting outcome, wherein the ranking is based on a comparison between the simulated result and the intended action regarding the current activity; and
        physically implementing an action based on the ranking and the plurality of auditory communications.

11. The system of claim 10, wherein the analyzing comprises:
    assigning a weight to each auditory communication based on one or more criterion; and
    ranking the relevant auditory communication by weight.

12. The system of claim 11, wherein the one or more criterion comprises one of an authority of a source of the relevant auditory communication and a relationship of a source of the relevant auditory communication with the same current activity.

13. The system of claim 10, wherein the one or more variables comprises at least one of available resources and available people.

14. A computer program product for determining contextual relevance in multi-auditory source scenarios, the computer program product comprising:

a storage medium readable by a processor and storing instructions for determining contextual relevance in multi-auditory source scenarios, the method comprising:
   receiving, by a cognitive system, a plurality of auditory communications from multiple different auditory sources regarding a same current activity;
   analyzing, by the cognitive system, each auditory communication of the plurality of auditory communications to determine an intended action of each auditory communication;
   creating a simulation of each intended action, by the cognitive system, to identify a resulting outcome of each intended action, wherein each simulation takes into account one or more variables related to the same current activity;
   ranking, by the cognitive system, each resulting outcome, wherein the ranking is based on a comparison between the simulated result and the intended action regarding the current activity; and
   physically implementing an action based on the ranking and the plurality of auditory communications.

15. The computer program product of claim 14, wherein the analyzing comprises:
   assigning a weight to each auditory communications based on one or more criterion; and
   ranking the relevant auditory communication by weight.

16. The computer program product of claim 15, wherein the one or more criterion comprises one of an authority of a source of each auditory communication and a relationship of a source of each auditory communication with the same current activity.

17. The computer program product of claim 14, wherein the one or more variables comprises at least one of available resources and available people.

\* \* \* \* \*